(12) United States Patent  (10) Patent No.: US 7,842,214 B2
Romdhane et al.  (45) Date of Patent: Nov. 30, 2010

(54) PROCESS FOR FORMING MICROPOROUS MEMBRANES

(75) Inventors: Ilyess H. Romdhane, Woodbury, MN (US); Scott L. Ciliske, Saint Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 584 days.

(21) Appl. No.: 11/692,257

(22) Filed: Mar. 28, 2007

(65) Prior Publication Data

US 2008/0241503 A1 Oct. 2, 2008

(51) Int. Cl.
*B29C 47/12* (2006.01)
*B01D 39/14* (2006.01)
*B01D 39/00* (2006.01)

(52) U.S. Cl. .............. 264/177.14; 264/176.1; 264/177.1; 264/204; 210/500.27; 210/500.39; 210/500.41; 210/500.38

(58) Field of Classification Search ............ 210/500.23, 210/500.27–500.43; 428/315.5; 264/41, 264/177.4, 176.1, 177.1, 204, 177.14
See application file for complete search history.

(56) References Cited

U.S. PATENT DOCUMENTS

| 2,783,894 | A | * | 3/1957 | Lovell et al. ........... 210/500.38 |
| 4,761,232 | A | | 8/1988 | Bright |
| 4,770,777 | A | | 9/1988 | Steadly et al. |
| 4,822,489 | A | * | 4/1989 | Nohmi et al. .......... 210/500.23 |
| 4,867,881 | A | | 9/1989 | Kinzer |
| 4,871,494 | A | | 10/1989 | Kesting et al. |
| 4,933,081 | A | * | 6/1990 | Sasaki et al. ................. 210/490 |
| 4,992,221 | A | | 2/1991 | Malon et al. |
| 5,049,276 | A | * | 9/1991 | Sasaki ................... 210/500.23 |
| 5,122,273 | A | * | 6/1992 | Rekers et al. .......... 210/500.27 |
| 5,151,227 | A | | 9/1992 | Nguyen et al. |
| 5,228,994 | A | | 7/1993 | Tkacik et al. |
| 5,238,618 | A | | 8/1993 | Kinzer |
| 5,344,701 | A | | 9/1994 | Gagnon et al. |
| 5,444,097 | A | | 8/1995 | Tkacik |
| 5,451,453 | A | | 9/1995 | Gagnon et al. |
| 5,476,665 | A | | 12/1995 | Dennison |
| 5,498,335 | A | | 3/1996 | Moya |
| 5,500,167 | A | * | 3/1996 | Degen ......................... 264/41 |
| 5,510,421 | A | | 4/1996 | Dennison et al. |
| 5,620,790 | A | | 4/1997 | Holzki et al. |
| 5,656,372 | A | | 8/1997 | Gentile et al. |

(Continued)

FOREIGN PATENT DOCUMENTS

EP 0 121 911 10/1984

(Continued)

OTHER PUBLICATIONS

Anderson, P. D., et al., "Viscoelastic Effects in Multilayer Polymer Extrusion," Applied Rheology, vol. 16, Issue 4, (2006) pp. 198-205.

(Continued)

*Primary Examiner*—Ana M Fortuna
(74) *Attorney, Agent, or Firm*—Daniel R. Pastirik

(57) ABSTRACT

A method for forming a microporous membrane having a microstructure is described. Dope and coagulant formulations are simultaneously cast, where the coagulant formulation diffuses into the dope formulation through an interface effecting a phase inversion forming a microstructure.

11 Claims, 3 Drawing Sheets

U.S. PATENT DOCUMENTS

| | | | |
|---|---|---|---|
| 5,708,040 A * | 1/1998 | Hong et al. | 521/64 |
| 5,869,174 A | 2/1999 | Wang | |
| 6,017,455 A * | 1/2000 | Shimoda et al. | 210/500.23 |
| 6,413,070 B1 | 7/2002 | Meyering et al. | |
| 6,513,666 B2 | 2/2003 | Meyering et al. | |
| 6,565,782 B1 * | 5/2003 | Wang et al. | 264/41 |
| 6,596,167 B2 | 7/2003 | Ji et al. | |
| 6,632,850 B2 | 10/2003 | Hughes et al. | |
| 6,706,184 B2 * | 3/2004 | Sale et al. | 210/500.27 |
| 6,736,971 B2 | 5/2004 | Sale et al. | |
| 6,776,940 B2 | 8/2004 | Meyering et al. | |
| 6,790,404 B2 | 9/2004 | Yapel et al. | |
| 6,805,730 B2 * | 10/2004 | Herczeg | 96/8 |
| 6,878,419 B2 | 4/2005 | David et al. | |
| 6,890,435 B2 | 5/2005 | Ji et al. | |
| 6,890,436 B2 * | 5/2005 | Komatsu et al. | 210/500.41 |
| 6,939,468 B2 * | 9/2005 | Wang et al. | 210/641 |
| 6,954,789 B2 * | 10/2005 | Dietz et al. | 709/224 |
| 6,994,789 B2 | 2/2006 | Sale et al. | |
| 7,067,058 B2 | 6/2006 | Yeh et al. | |
| 7,081,273 B2 | 7/2006 | Ji | |
| 7,112,272 B2 | 9/2006 | Hughes et al. | |
| 7,112,280 B2 | 9/2006 | Hughes et al. | |
| 7,125,603 B2 | 10/2006 | David et al. | |
| 2001/0017280 A1 | 8/2001 | Meyering et al. | |
| 2002/0113006 A1 | 8/2002 | Sale et al. | |
| 2003/0038391 A1 | 2/2003 | Meyering et al. | |
| 2003/0209485 A1 | 11/2003 | Kools | |
| 2003/0213744 A1 | 11/2003 | Kools et al. | |
| 2004/0084364 A1 | 5/2004 | Kools | |
| 2006/0196830 A1 | 9/2006 | Sale et al. | |

FOREIGN PATENT DOCUMENTS

| | | |
|---|---|---|
| KR | 2001-0061733 | 7/2001 |
| KR | 2001-0078512 | 8/2001 |
| WO | WO 00/45942 | 8/2000 |
| WO | WO 2004/009611 A2 | 1/2004 |
| WO | WO 2006/069307 A2 | 6/2006 |

OTHER PUBLICATIONS

Barton, Allan F.M., *CRC Handbook of Polymer-Liquid Interaction Parameters and Solubility Parameters*, CRC Press, Boca Raton, FL (1990).

Barton, Allan F.M., *CRC Handbook of Solubility Parameters and Other Cohesion Parameters*, Second Edition, CRC Press, Boca Raton, FL (1991).

Bauer, C.J.M., et al., "The Resistance Towards Gas Transport of the Sublayer of Asymmetric PPO Hollow Fiber Membranes Determined by Plasma-Etching," Journal of Membrane Science, vol. 57, (1991) pp. 307-320.

Grulke, Eric A., "Solubility Parameter Values," Polymer Handbook, 4$^{th}$ Ed., VII, (1999) pp. 675-688.

Khulbe, K.C., et al., "Characterization of PPO Membranes by Oxygen Plasma Etching, Gas Separation and Atomic Force Microscopy," Journal of Membrane Science, vol. 171, (2000) pp. 273-284.

Kesting, Robert E., *Synthetic Polymeric Membranes*, Second Edition. John Wiley and Sons, Inc., NY, (1985).

U.S. Application entitled "Coating Die Having Quick Assembly Features," filed Oct. 29, 2004, having U.S. Appl. No. 10/977,273.

U.S. Application entitled "Reinforced Ion-Conductive Membranes," filed Dec. 7, 2005, having U.S. Appl. No. 11/295,764.

\* cited by examiner

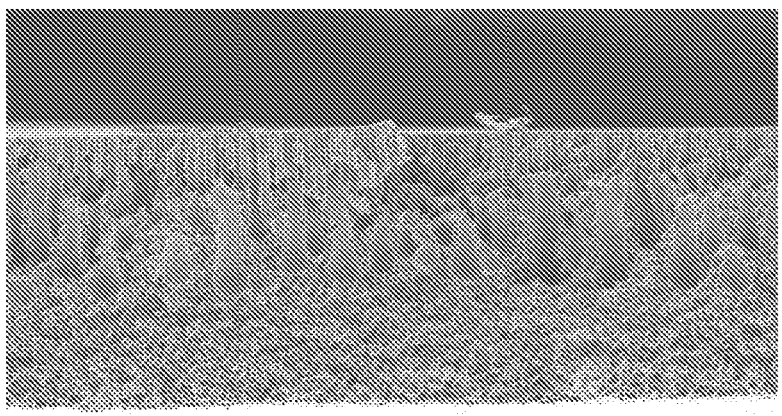
*Fig. 6*  60.0 µm
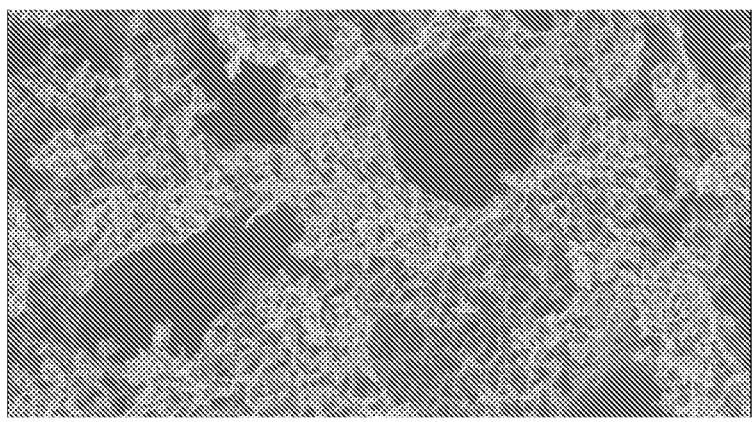
*Fig. 7*  60.0 µm
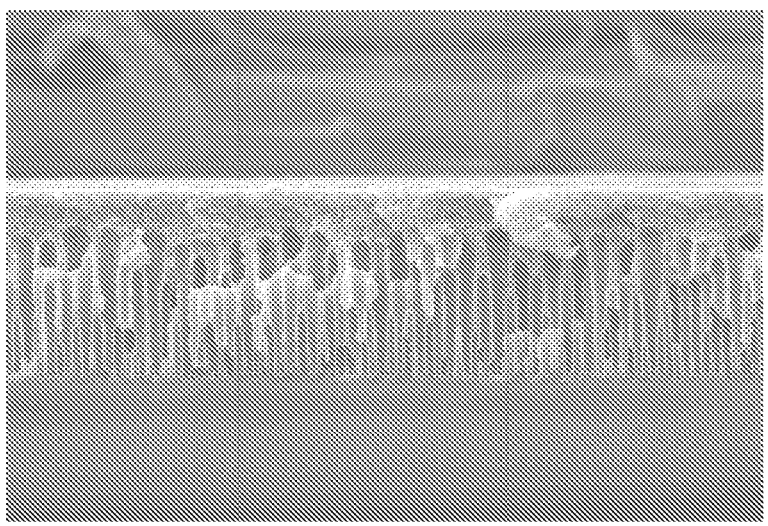
*Fig. 8*  100.0 µm

PROCESS FOR FORMING MICROPOROUS MEMBRANES

FIELD

The present invention relates to a method for forming microporous membranes.

BACKGROUND

Microporous membranes with diverse properties are used in many modern products, including such things as filters, breathable articles, absorbent articles, and medical articles. There are many known ways to manufacture microporous membranes, including inducing a phase inversion in a dope layer. By manipulating the conditions that trigger the phase inversion, different morphologies can be generated in the resulting microporous membrane, adapting it to the specific needs of the end user.

One of the ways that a phase inversion can be triggered is by contacting a dope formulation with a coagulant. Methods of making microporous membranes are further described in U.S. Pat. No. 6,736,971 (Sale et al.); U.S. Pat. No. 5,869,174 (Wang); U.S. Pat. No. 6,632,850 (Hughes et al.); U.S. Pat. No. 4,992,221 (Malon et al.); U.S. Pat. No. 6,596,167 (Ji et al.); U.S. Pat. No. 5,510,421 (Dennis et al.); U.S. Pat. No. 5,476,665 (Dennison et al.); and U.S. Patent Application Publication Nos. 2003/0209485; 2004/0084364 (Kools).

One known way to introduce a coagulant to a dope layer is in the form of a vapor. It is also known to coagulate the dope layer, where the dope layer is moved through a coagulation bath. The bath would normally be constantly changing in concentration and purity as material diffuses into and out of the dope layer.

SUMMARY

Microporous membranes having a microstructure are described. The present disclosure describes a method for forming microporous membrane sheets. The microporous membrane is formed from a dope formulation and a first coagulant formulation. The dope formulation comprises a polymeric material and a solvent. The first coagulant formulation comprises a coagulant and a coating adjuvant. The dope and first coagulant formulations are simultaneously cast through a multilayer extrusion die. The dope formulation layer is cast on to the coagulant formulation forming an interface. A first surface of the dope formulation layer is located opposite the interface. At the interface, a portion of the first coagulant formulation layer diffuses into the dope formulation layer effecting a first phase inversion. The first phase inversion results from the first coagulant of the first coagulant formulation contacting the polymeric material of the dope formulation reducing the thermodynamic stability of the polymeric material in the solvent. The first phase inversion forms a first microstructure of a microporous membrane.

In one embodiment, a first surface of a microporous membrane is contacted with a second coagulant, where the second coagulant is a vapor. A portion of the second coagulant diffuses through the first surface of the dope formulation layer effecting a second phase inversion. The second phase inversion forms a second microstructure of the microporous membrane.

In one aspect, a method for forming a microporous membrane sheet having at least two microstructures is described. The microporous membrane is formed from a dope formulation simultaneously cast with first and second coagulant formulations. The second coagulant formulation comprises a third coagulant and a second coating adjuvant. The dope formulation may be simultaneously cast between the first and second coagulant formulations with a multilayer extrusion die. A first interface is formed between the dope formulation and the first coagulant formulation, and a second interface is formed between the dope formulation and the second coagulant formulation. The first interface is opposite the second interface. A portion of the first coagulant formulation diffuses into the dope formulation through the first interface effecting a first phase inversion, and a portion of the second coagulant formulation diffuses into the dope formulation through the second interface effecting a second phase inversion. The first and second phase inversions form first and second microstructures of a microporous membrane, respectively. The first and second microstructures may be different or the same.

In one embodiment, a second coagulant formulation comprising a third coagulant and a second coating adjuvant is cast sequentially on the first surface of the dope formulation layer after simultaneously casting dope and first coagulant formulations.

Microporous membranes are commonly formed having dope layers exposed to a coagulation bath causing a phase inversion. In this disclosure, dope and coagulant formulations and/or coagulants contact one another as layers to effect a phase inversion resulting in forming microstructures. Casting the formulations simultaneously with a multilayer extrusion die forming a multilayer sheet removes the step of subjecting the dope layers to coagulation baths. A multilayer extrusion die removes the cost and complexities of multiple step coating processes, where individual layers are coated. Further, the multilayer extrusion die allows for coating of multiple thin layers which may be difficult with wet on wet coating methods. A multilayer sheet having thin layers may be formed having layers of specific thicknesses to meet particular specifications as a multilayer membrane. A coagulant formulation having a coating adjuvant of this disclosure provides for selecting a rate of phase inversion, controlling the depth of the phase inversion within the thickness of the membrane, and selecting a microstructure for the membrane.

BRIEF DESCRIPTION OF THE DRAWINGS

FIG. 6 is a SEM micrograph cross-section of a microporous membrane having first and second microstructures of Example 2.

FIG. 7 is a SEM micrograph (planar view) of a microporous membrane of FIG. 6.

FIG. 8 is a SEM micrograph cross-section of a microporous membrane having first and second microstructures of Example 3.

DETAILED DESCRIPTION

Figure 1:
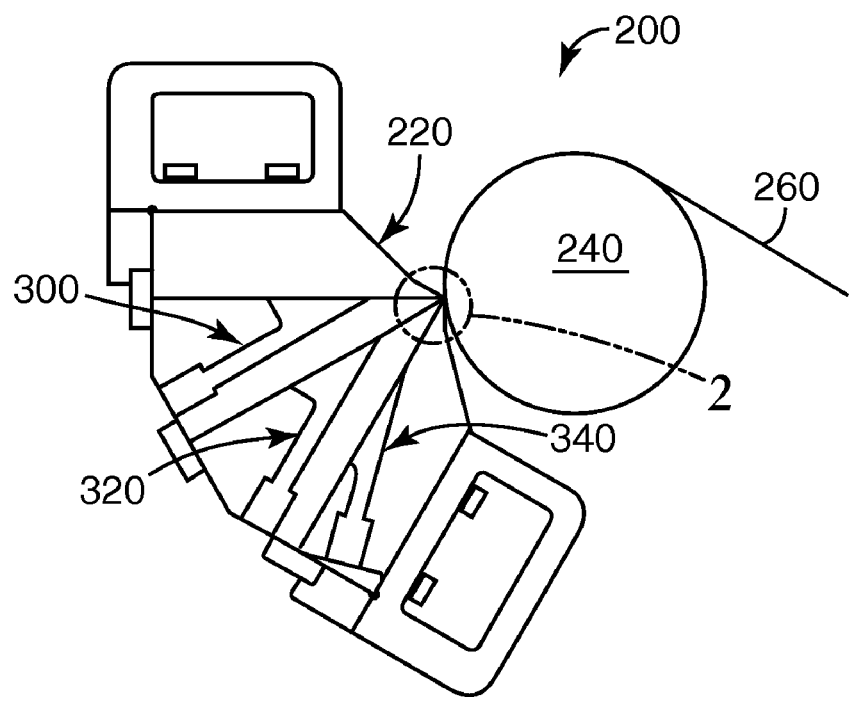
FIG. 1 is a schematic representation of a multilayer extrusion die.

For the following defined terms, these definitions shall be applied, unless a different definition is given in the claims or elsewhere in the specification.

The term "dope formulation" refers to a polymeric material dissolved in a solvent at a selected concentration for forming a thermodynamically stable dope formulation. The solvent is referred to as a "good" or compatible solvent for the polymeric material. The dope formulation has a suitable viscosity for simultaneously casting with at least one coagulant formulation. The dope formulation may optionally further comprise a porogen (pore former) and/or a nonsolvent.

The term "coagulant formulation" refers to a coagulant and a coating adjuvant useful in a liquid-polymer induced phase separation. The coagulant (i.e., liquid) can be a "nonsolvent" for the polymeric material of the dope formulation. The coagulant may be generally regarded as incompatible with the polymeric material. The coagulant reduces the thermodynamic stability of the polymeric material in a solvent of the dope formulation. The coagulant formulation has a suitable viscosity for simultaneously casting with a dope formulation. The coagulant formulation may optionally further comprise more than one coating adjuvant, and/or more than one coagulant.

The term "coating adjuvant" refers to an additive(s) dissolved or dispersed in a coagulant formulation. The coating adjuvant(s) can be added to adjust the viscosity of the coagulant formulation sufficient for casting on to a dope formulation. The concentration of the coating adjuvant(s) may be selected to control the rate of phase inversion, to control the depth of the phase inversion, or to form a specific microstructure of the membrane.

The term "simultaneously casting" refers to forming at least two or more layers on to each other to form a multilayered sheet. The dope and coagulant formulation layers may be cast through a multilayer extrusion die, where the formulation layers immediately contact each other at the exit of the die. The die may be used to meter the dope formulation and coagulant formulations having sufficient viscosity, such that the thickness of the layers is substantially controlled through the control of the formulation feed rate.

The term "phase inversion" refers to the transformation of a homogenous system (e.g., dope formulation) into two or more phases. For example, a homogeneous polymer solution can be precipitated into two phases: a solid polymer-rich phase, and a liquid polymer-poor phase. In this disclosure, for example, phase inversion results from a process of exposing a dope formulation to a coagulant formulation, where each of the formulations have sufficient viscosity to be simultaneously cast as layers through, e.g., a multilayer extrusion die so as to form sheets. Some other phase inversion mechanisms include thermal induced phase inversion and liquid-liquid phase inversion.

The term "microstructure" refers to a porous structure. The porous structure may comprise openings which may be assymetrical or symmetrical. For example, a membrane may have more than one porous structure. The porous structure may result from a phase inversion of polymeric material, where polymer-rich regions may form the structure, and the polymer-poor regions may form the openings within the structure. In a membrane having more than one porous structure, the porous structures may be different or the same. The pores of a porous structure may have an average diameter of 0.05 to 25 microns.

The recitation of numerical ranges by endpoints includes all numbers subsumed within that range (e.g., 1 to 5 includes 1, 1.5, 2, 2.75, 3, 3.8, 4, and 5).

As included in this specification and the appended claims, the singular forms "a", "an", and "the" include plural referents unless the content clearly dictates otherwise. Thus, for example, reference to a composition containing "a compound" includes a mixture of two or more compounds. As used in this specification and appended claims, the term "or" is generally employed in its sense including "and/or" unless the content clearly dictates otherwise.

Unless otherwise indicated, all numbers expressing quantities or ingredients, measurement of properties and so forth used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings of the present disclosure. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the disclosure are approximations, the numerical values set forth in the specific examples are reported as precisely as possible. Any numerical value, however, inherently contains errors necessarily resulting from the standard deviations found in their respective testing measurements.

The present disclosure describes a method for forming a microporous membrane sheet.

A dope formulation may be cast as a layer for forming a sheet. The dope formulation comprises a polymeric material which can dissolve in a solvent with optional additives (e.g., porogens) and/or nonsolvents to form a substantially homogeneous stable formulation. The dope formulation may be thermodynamically stable at room temperature without visible phase separation.

Dope formulations may be formed from one or more formulations having suitable concentrations of solvents and/or nonsolvents. The concentration of the dope formulation can be changed to accommodate a particular microstructure, and also to maintain the integrity of the membrane. If a concentration of a polymer material in a dope formulation is too low, a membrane may not be formed. If the concentration is too high, an undesired irregular microstructure may result.

The concentration of the polymeric material in the dope formulation may vary based on the solvents, additives and nonsolvents used for constructing the membrane. The concentration or percent solids of a polymeric material dissolved in a solvent of a dope formulation may be selected to achieve a viscosity and/or surface tension sufficient for casting as a layer in a multilayer sheet. The concentration is selected to be sufficient to allow diffusion of a coagulant formulation through an interface of the coextruded layers. The concentration of the polymeric material in a solvent of the dope formulation may be in a range of 10 to 25 weight percent. Preferably, the concentration of the polymeric material is in a range of 10 to 20 weight percent.

The viscosity of a dope formulation may be selected for casting as a dope formulation layer on a coagulant formulation layer in a multilayer sheet. The viscosity is selected to provide stable layer formation at a line speed of, e.g., a moving substrate. Similarly, surface tension, general bead stability and other fluid properties of the formulations may be selected to ensure coating uniformity. The stable layer formation promotes predictable diffusion of a portion of the coagulant formulation at the first surface of the dope and coagulant formulation layers. An appropriate choice for the viscosity of the dope formulation also promotes the development of a uniform thickness of the dope formulation layer, and ultimately a uniform thickness of the microporous sheet that will be formed. The viscosity of the dope formulation may be in a range of 20 to 4,000 centipoise. Preferably, the viscosity of the dope formulation is in a range of 25 to 2,000 centipoise, and more preferably, in a range of 25 to 1,000 centipoise.

A number of polymeric materials are available and can be used for the formation of membranes of this disclosure. The polymeric materials or a blend of polymeric materials may be used for a dope formulation. Examples of polymeric materials may include polyethersulfones, polyetherimides, polyimides, polyamides, polysulfones, polyarylsulphones, polyvinyl chloride, polyethylene terephthalate, polycarbonates, polyolefins such as polyethylene or polypropylene, cellulose esters such as cellulose acetate or cellulose nitrate, polystyrenes, acrylic polymers, methacrylic polymers, copolymers of acrylic or methacrylic polymers, and combinations thereof. The dope formulation can be a solution of the solvent and of polymers that can be amorphous, crystalline, noncrystalline or partially crystalline. In one embodiment, the polymeric material of the dope formulation is polyetherimide (I).

lation may comprise more than one solvent, a blend of solvents, or a nonsolvent for phase inversion. A nonsolvent is a material that is miscible in the solvent of the dope formulation, but which, by itself, is insoluble with the polymer or may cause coagulation of the polymer. The nonsolvent may be added to a solvent to influence the rate of a phase inversion or aid in the development of a microstructure.

The selection of a solvent for a dope formulation to provide a stable homogeneous solution for casting in the formation of membranes involves basic principles of polymer solubility. Polymer solvents may be categorized as good solvents, nonsolvents, and poor solvents. Good solvents are those in which the interactions (forces) between the polymer molecules and solvent molecules are greater than the forces of attraction between one polymer molecule and another polymer molecule. The reverse is true for nonsolvents. Poor solvents are those in which the interactions between the polymer and solvent are equal to the forces of attraction between one polymer and another polymer molecule.

Good solvents dissolve substantial amounts of polymer and may be miscible with the polymer at concentrations of at least 5 weight percent, whereas poor solvents may or may not be miscible, depending upon the molecular weight of the polymer and the type of solvent.

In one embodiment, a stable homogeneous dope formulation can be obtained by first dissolving a polymer in a good

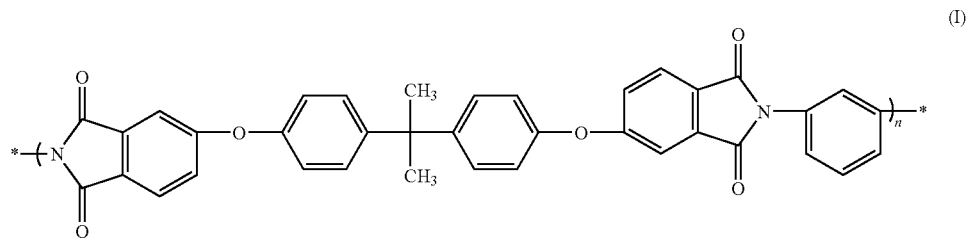

In a further embodiment, the polymeric material of the dope formulation is polyethersulfone (II).

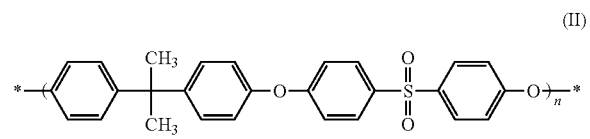

The solvent of a dope formulation dissolves the polymeric material to provide a homogeneous solution. The solvent of the dope solution can be a solvent for an optional nonsolvent, i.e., for the polymeric material, and optional additives present in the dope formulation. When present, the nonsolvent may be added to the formulation at a concentration in a range of 0.05 to 5 weight percent. Selection of a solvent for the membrane may influence properties, such as the rate of phase inversion or the type of microstructure, when the dope formulation contacts a coagulant formulation. Some examples of solvents for the dope formulation may include water, dimethyl formamide, N,N-dimethylacetamide, N-methyl-2-pyrrolidinone, tetramethylurea, acetone, methyl ethyl ketone, methyl acetate, ethylacetate and other alkyl acetates, dimethylsulfoxide and combinations thereof. The solvent may be oligomeric or polymeric in nature forming a polymer blend with the polymeric material. The solvent of the dope formusolvent (e.g., when polyethersulfone is the polymer, the use of N-methyl-2-pyrrolidinone as the solvent). Other examples of good solvents for polyethersulfone include dimethylacetamide, dioxane, dimethylsulfoxide, chloroform, tetramethylurea, and tetrachloroethane.

Another method for evaluating solvents for polymer solubility includes Hildebrand solubility parameters. These parameters refer to a solubility parameter represented by the square root of the cohesive energy density of a material, having units of $(\text{pressure})^{1/2}$, and being equal to $(\Delta H-RT)^{1/2}V^{1/2}$ where $\Delta H$ is the molar vaporization enthalpy of the material, R is the universal gas constant, T is the absolute temperature, and V is the molar volume of the solvent. Hildebrand solubility parameters are tabulated for solvents in: Barton, A. F. M., "Handbook of Solubility and Other Cohesion Parameters", $2^{nd}$ Ed., CRC Press, Boca Raton, Fla. (1991); for monomers and representative polymers in "Polymer Handbook", $4^{th}$ Ed., J. Brandrup & E. H. Immergut, Eds. John Wiley, NY, pp. VII 675-714 (1999); and for many commercially available polymers in Barton, A. F. M., "Handbook of Polymer-Liquid Interaction Parameters and Solubility Parameters", CRC Press, Boca Raton, Fla. (1990).

A coagulant formulation may be cast as a layer of a multilayer sheet for forming microporous membranes. The coagulant formulation can comprise a coagulant and a coating adjuvant. In some embodiments, the coagulant does not comprise a coating adjuvant. The coagulant can be a nonsolvent for the polymeric material of the dope formulation.

Membranes may be formed from a coagulant formulation simultaneously cast with a dope formulation resulting in a phase inversion and the formation of a microstructure. The coagulant of the coagulant formulation has a concentration selected to reduce the thermodynamic stability of the dope formulation when the formulations are cast as layers.

The coagulant is considered a nonsolvent for the polymeric material of the dope formulation, where the polymeric material is insoluble in the coagulant. As a nonsolvent, the attraction between the coagulant molecules and the polymer chains of the polymeric material is less than the attraction between one polymer chain of the material and a second polymer chain of the same polymeric material. The coagulant may have limited solubility in the solvent of the dope formulation. The solvent of the dope formulation is preferred to be miscible with the coagulant during membrane formation.

Examples of coagulants of a coagulant formulation may include water, alcohols, ethers, oligoalkyleneoxides and ethers of oligoalkyleneoxides, polyalkyleneoxides and their ethers. A particularly useful group of compounds suitable as a coagulant of the coagulant formulation are oligoalkyleneoxides (III) of the general formula,

$$R^1-(OR^2)_x-OR^3 \quad \text{(III)}$$

where x is 1 to 25; $R^1$, $R^3$ are H, or $C_nH_{2n+1}$, where n=1 to 5; $R^2$ is $C_nH_{2n}$, where n=1 to 8. $R^1$ and $R^3$ may be the same or different.

Further examples of coagulants as nonsolvents for a polymeric material (e.g., polyethersulfone) of a dope formulation may include 2-methoxyethanol, propionic acid, t-amyl alcohol, methanol, ethanol, isopropanol, hexanol, heptanol, octanol, acetone, methyethyl ketone, methylisobutylketone, butyl ether, ethyl acetate amyl acetate, glycerol, diethyleneglycol dibutylether, and water. The concentration of coagulant may be determined by the polymeric material and the solvent of the dope formulation, and by the processing conditions for preparation of a membrane. In one embodiment, a coagulant of a coagulant formulation for polyethersulfone is water.

A coagulant formulation can have a viscosity sufficient to allow diffusion of a portion of the coagulant formulation through a first surface formed with a dope formulation layer. The viscosity of the coagulant formulation may be adjusted by the addition of a coating adjuvant to provide a uniform thickness as a coagulant formulation layer when cast on to the dope formulation layer. Other coating formulation properties to be considered include surface tension, general bead stability and other formulation properties may be selected to influence coating uniformity of the layers. Materials other than coating adjuvants, such as surfactants, may be added to influence surface tension, interfacial stability, wettability, and dimensional stability. The viscosity of the coagulant formulation having a coating adjuvant may be in a range of 20 to 4,000 centipoise. Preferably, the viscosity of the coagulant formulation is in a range of 25 to 2,000 centipoise, and more preferably, in a range of 25 to 1,000 centipoise. Some examples of coating adjuvants include poly(ethylene glycols), polyhydric compounds, polyethers and combinations thereof. The concentration of the coating adjuvant of a coagulant formulation is in a range 20 to 95 weight percent. Preferably, the concentration of the coating adjuvant is in a range of 25 to 90 weight percent. In one embodiment, the coating adjuvant for a coagulant formulation is poly(ethylene glycol).

The coating adjuvant may be compatible with the polymeric material and/or solvent of the dope formulation layer. The coating adjuvant may be added to a coagulant formulation to adjust the viscosity of the coagulant for casting as a layer. The coating adjuvant of the coagulant formulation may be added at a concentration sufficient to allow diffusion of a portion of the coagulant formulation through a surface of the cast dope and coagulant formulation layers. In one embodiment, the coagulant formulation comprises water and poly(ethylene glycol).

In one embodiment, the coagulant may form a homogeneous solution with a coating adjuvant. Upon contacting the dope formulation, the coagulant formulation may diffuse into the dope formulation layer, and coagulate the polymeric material causing a phase inversion, thus changing the thermodynamic stability of the polymeric material in the solvent of the dope formulation. Polymer rich and polymer poor regions may form during the thermodynamic change of the polymeric material in the solvent. The polymer rich regions form a continuous structure and the polymer material poor regions form pores of the resulting microstructure.

In one embodiment, the coating adjuvant may be added to a coagulant formulation at a selected concentration to control the rate (kinetics) of the phase inversion forming a membrane. The kinetics of the phase inversion may be generally dictated by the process conditions and the components of dope and coagulant formulations.

In one embodiment, the coating adjuvant may be added to a coagulant formulation at a selected concentration for effecting a phase inversion upon contacting the dope formulation layer at a predetermined depth of a thickness of a membrane. The thickness of the membrane extends in the z-dimension. The depth of the phase inversion may be dictated by the processing conditions and the type of dope and coagulant formulations. The depth of the phase inversion resulting in a microstructure may be in a range of 5 to 100 percent of the thickness of the membrane. More preferably, the depth of the phase inversion may be in a range of 5 to 75 percent, and most preferably in a range of 10 to 60 percent.

In one embodiment, a concentration of a coating adjuvant of a coagulant formulation is selected to effect a phase inversion resulting in a defined microstructure upon contacting the dope formulation layer. Suitable selection of coagulant formulation and dope formulation layers may yield certain pore size distributions and porosities. For example, a membrane formed from the phase inversion of a polyethersulfone dope formulation contacted by two different coagulant formulations on opposite sides may result in a first microstructure having an open celled spongy microstructure on a first surface of, and a second microstructure having interconnected parallel elongated pores extending in a z-dimension on a second surface. Multiple microstructures within a membrane, referred to as multizone membranes, can provide high throughput and high flux in filtration applications.

In another embodiment, a porogen may be an additive of a dope formulation. The porogen may be added to provide for a selected microstructure within the membrane, or to control the rate of phase inversion within the membrane. Some examples of porogens include poly(ethylene glycols), polyhydric compounds, polyethers and combinations thereof.

A selection of components of dope and coagulant formulations for simultaneously casting layers for forming microporous membranes is described above. The absence of a coagulation bath in this disclosure for inducing a phase inversion eliminates a costly downstream process for forming membranes by traditional processes. Tailoring of concentrations of solvents, nonsolvents, polymeric materials, and additives in the dope and coagulant formulations may be used to control the rate of phase inversion, to control the depth of the phase inversion of a multilayered sheet, or to target a specific microstructure for a membrane.

Metering the flow rate of dope and coagulant formulations, which can correspond to the coating thickness, e.g., from a multilayer extrusion die, may control the depth of a phase inversion in a dope formulation layer(s). Selection of a specific surface of the dope formulation layer to cast the coagulant formulation can be determined prior to depositing the dope and coagulant formulations as a multilayered sheet on a backup roll or temporary support. In other processes described in the art, a coagulation bath used for coagulating the dope layer would have to be continually filtered or the contents of the bath removed and refilled with new coagulants in light of a continuous solvent exchange process.

The concentration of the polymeric material of the dope formulation and the concentration of the coating adjuvant of the coagulant formulation may be selected to provide suitable formulation viscosities for casting the formulations without or with a backup roll or temporary support. The concentration or solids levels of the dope and coagulation formulations may be selected to maintain a viscosity sufficient for casting the dope and coagulant formulations, followed by subsequent phase inversion at an interface between the layers. Viscosities higher than an appropriate range needed for simultaneously casting and phase inversion may form a membrane having little porosity, and where the amount of solids is too low resulting in a low viscosity formulation, a membrane structure may be unattainable.

Illustrated in FIG. 1 is a schematic cross-section representation of a multilayer extrusion die 200 which is capable of forming multilayer sheets. The multilayer extrusion die 200 includes an extrusion head 220 disposed adjacent to a backup roll 240. The backup roll 240 is a rotatable roll that receives extruded layers from the extrusion head 220. In some embodiments, the backup roll 240 may optionally support a liner 260 to support the coextruded layers (i.e., sheet) as they proceed to form a microporous membrane.

The extrusion head 220 of FIG. 1 includes a dope formulation cavity 320 and coagulant formulation cavities 300, 340 ending in extrusion slots that serve as pathways for coextruding the dope and coagulant formulations. The dimensions of the extrusion slots may be conveniently established by placing precision metal shims of a necessary thickness between bars of the die. In carrying out the method of the present disclosure, a dope formulation is introduced into cavity 320 so as to subsequently form a dope formulation layer. Similarly, a coagulant formulation may be introduced into cavities 300 and/or 340 to subsequently form coagulant formulation layers on one or more surfaces of the dope formulation layer.

Figure 2:
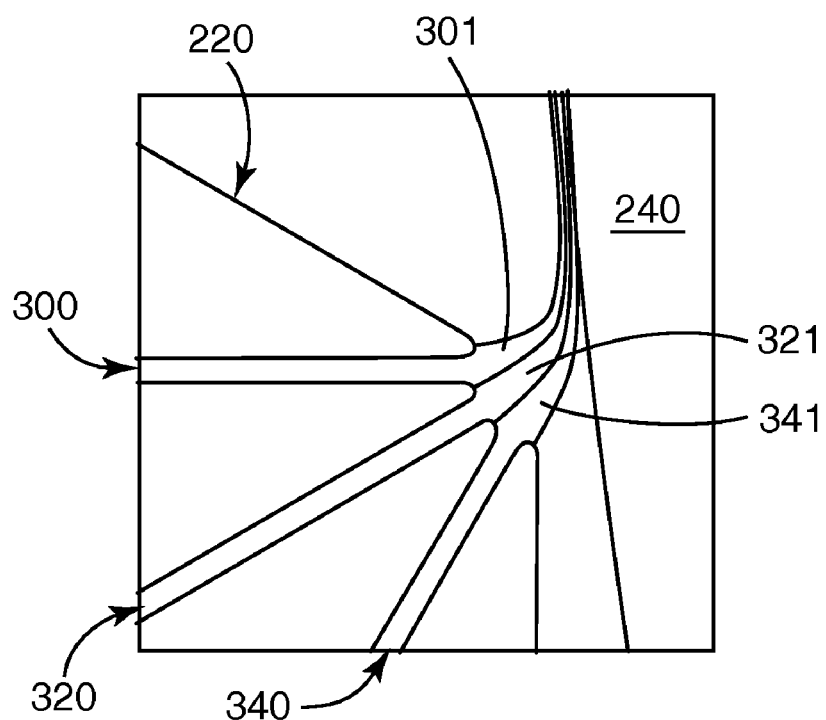
FIG. 2 is a schematic representation of an expanded view of detail 2 taken in FIG. 1.

In FIG. 2, an enlarged view of detail 2 taken in FIG. 1 is illustrated. In detail 2, the dope and/or coagulant formulation(s) are extruded from extrusion head 220 of FIG. 1, specifically from the extrusion slots extending from cavities 300, 320, 340 creating dope 321 and first 301 and second coagulation 341 formulations. In FIG. 2, the dope 321 and first 301 and second 341 coagulant formulations are drawn away by contact with the rotating backup roll 240.

The multilayer extrusion die 200 controls the form of the article shaping a cylindrical pipe flow into a sheet. Metering of the formulations can be either self-metered, e.g., a constant pressure solution handling system feeding a slot die with either pressure pots, head boxes or centrifugal pumps; or pre-metered, e.g., a positive displacement syringe pump that meters the flow of formulations to the die cavity relative to the width and speed of the cast multilayer sheet, thereby stabilizing the basis weight of the incompressible liquid sheet at a desired predetermined value.

Figure 3:
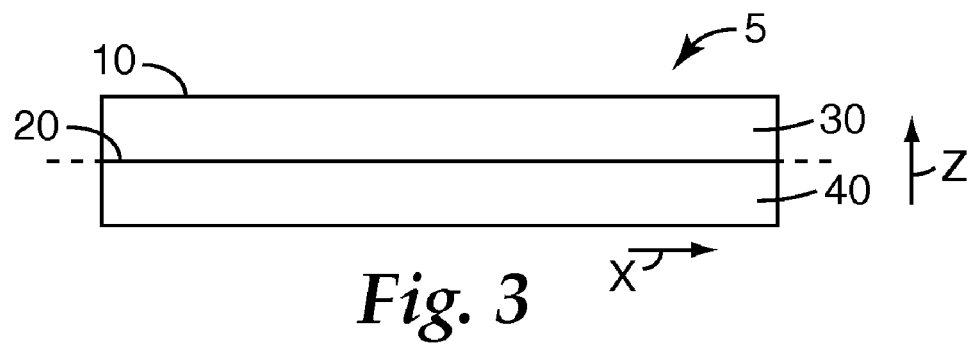
FIG. 3 is a schematic representation of multilayer sheet having a dope formulation layer on a coagulant formulation layer.

A method for forming a two layer sheet 5 comprises simultaneously casting a dope formulation and a coagulant formulation as layers illustrated in FIG. 3. An interface 20 is formed where dope 30 and coagulant 40 formulation layers contact one another. A first surface 10 of the dope formulation is located opposite of the interface 20 formed between the cast dope 30 and coagulation 40 formulation layers of the two layer sheet 5. Casting of the dope and coagulant formulations simultaneously further provides for a portion of the coagulant formulation to diffuse into the dope formulation through the interface 20 effecting a phase inversion. The phase inversion of the polymeric material of the dope formulation results in a first microstructure.

The layer thicknesses depend not only on the multilayer extrusion die geometry, but also on flow and viscosity of the dope and coagulant formulations. Subsequent phase inversion at the first surface 10 of the two layer sheet 5 may occur from the introduction of a vapor as a coagulant.

Vapor phase induced phase inversion (i.e., air casting) generally includes a coagulant (e.g., water vapor) for inducing a phase inversion. The coagulant can be introduced to a polymeric material of a dope formulation as a vapor. A high concentration of vapor may condense and reduce the thermodynamic stability of the polymeric material dissolved in a solvent. Analogous to a liquid induced phase separation, polymer rich and polymer poor regions are formed from the vapor induced phase inversion resulting in the formation of a microstructure. Examples of coagulants for vapor induced phase separation include water, alcohols, amides and combinations thereof.

Figure 4:
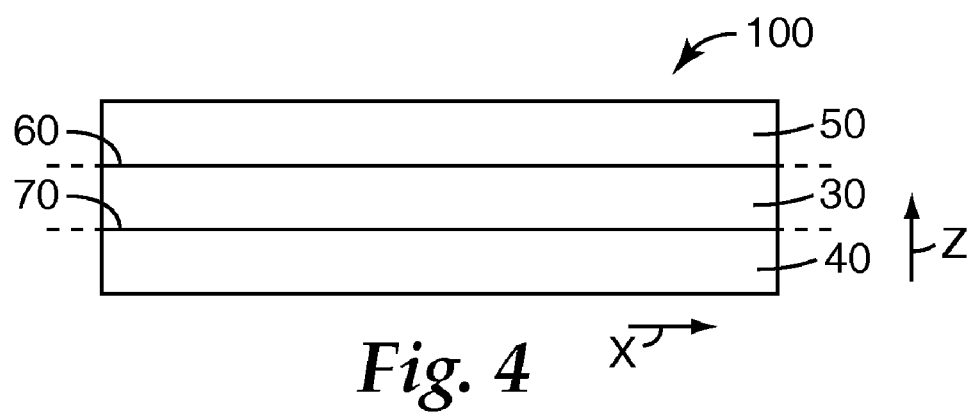
FIG. 4 is a schematic representation of a multilayer sheet having a dope layer in between a first and second coagulant formulation layers.

In one embodiment, multiple layers of dope and coagulant formulations may be cast as a sheet to form a three layer sheet 100 as illustrated in FIG. 4. FIG. 4 illustrates a three layer sheet 100 having a dope formulation layer 30, and a first 40 and second 50 coagulant formulation layers. The coagulant of the first and second coagulant formulations may be a liquid. The thickness of the dope and coagulant layers may be dependent on the viscosity and flow of the dope and coagulant formulations, and the configuration of a multilayer extrusion die. An interface 70 may be formed where the dope formulation layer 30 is cast on to a first coagulant formulation 40 layer. A first surface 60 of the three layer sheet 100 may be formed where the dope formulation layer 30 is cast on to a second coagulant formulation 50 layer. The first coagulant formulation 40 and dope formulation 30 layers at the interface 70 provide for flow and diffusion of a portion of the first coagulant formulation 40 layer into the dope formulation layer 30 effecting a first phase inversion. The second coagulant formulation 50 and dope formulation 30 at the first surface 60 provide for flow and diffusion of a portion of the second coagulant formulation 50 layer into the dope formulation layer 30 effecting a second phase inversion.

Phase inversions at first and second surfaces of a dope formulation layer can occur when first and second coagulant formulation layers are each located on opposite surfaces of the dope formulation layer. The resulting phase inversions at the first and second surfaces form first and second microstructures. The morphology and depth of microstructures may be different or the same in membranes having more than one microstructure. The selection of membrane microstructures may be further selected by the concentration and selection of the components of the dope and coagulant formulations, and processing conditions. In one embodiment, dope and coagulant formulations may be simultaneously cast at room temperature.

In one embodiment, dope and coagulation formulations may be simultaneously cast by means of a multilayer extrusion die 200 of FIG. 1. The multilayer extrusion die 200 may cast the dope and coagulant formulations as layers to form a sheet, where the layers are substantially linear in a cross-web or an x-dimension.

A phase inversion process may be initiated by diffusion of a portion of a coagulant formulation layer into a dope formulation layer after the coagulant and dope formulations have exited the extrusion head 220 as illustrated in FIG. 1 and FIG. 2. The process can include metering the dope and coagulant formulations having a selected viscosity using a multilayer extrusion die 200 of FIG. 1 to form a multilayer sheet, where the dope and coagulant formulation layers partially or fully coagulate to form a microporous membrane.

Contact of dope and coagulant formulations at a surface, and the diffusion of a portion of the coagulant formulation into the dope formulation may cause the polymeric material of the dope formulation to become thermodynamically unstable. The polymeric material can precipitate from the solvent of the dope formulation forming a microstructure. During phase inversion, regions of the dope formulation layer are rich in polymeric material forming a structure, and some regions are poor in polymeric material forming pores. Membranes may be further subjected to solvent removal and subsequent drying after development of the microstructures. Effective pore sizes of a membrane may be in a range of 0.05 to 50 microns. Pore size refers to the diameter of an opening within a microstructure formed during a phase inversion. Pore sizes may be measured by the Bubble Point Pressure method described in the Examples section. Some other pore size and pore size distribution measurement methods may include solute retention, and flow/pressure techniques. Solvent phase inversion techniques are disclosed in Keating, "Synthetic Polymeric Membranes, A Structural Perspective", $2^{nd}$ Ed., John Wiley and Sons, 1995, incorporated herein by reference.

A phase inversion of this disclosure may include diffusion of dope and coagulant formulation layers through a liquid-liquid polymer surface. A portion of a coagulant formulation layer diffuses into a dope formulation layer. The coagulant of the coagulant formulation may be thermodynamically compatible with the solvent of the dope formulation and/or other additives in order facilitate movement and diffusion of the coagulant within the dope formulation layer. The coagulant may generally be incompatible with the polymeric material of the dope layer reducing the solvency or compatibility of the polymeric material in the solvent. The instability creates a phase inversion of the polymeric material resulting in the formation of a microstructure.

The microstructures of the membranes can have pores which are asymmetric or symmetric through the thickness or z-dimension of the membrane. A number of microstructures may be formed which may be dependent on the dope and coagulation formulations used and the processing parameters. A first microstructure may be the same or different than a second microstructure. The first and second microstructures may provide a continuous or discontinuous path through the membrane. The formation of the microstructures may depend on the concentration of some of the components (e.g., polymeric material, coagulant, coating adjuvant) of the dope and coagulant formulations. The morphology of the microstructure may further depend on the metering (e.g., layer thickness) of the dope and coagulant formulations and/or the rate of phase inversion. The microstructure morphology may also depend on the phase inversion mechanism, and related pressure and temperature processing conditions.

In general, the pores of a microstructure may be open and/or closed cells. A first face of the membrane may have relatively small diameter pores, while the second or opposite face may have relatively large diameter pores. The ratio of pores sizes at the first face to pore sizes at the second face of the membrane may in a range of 10:1 to 100:1.

Figure 5:
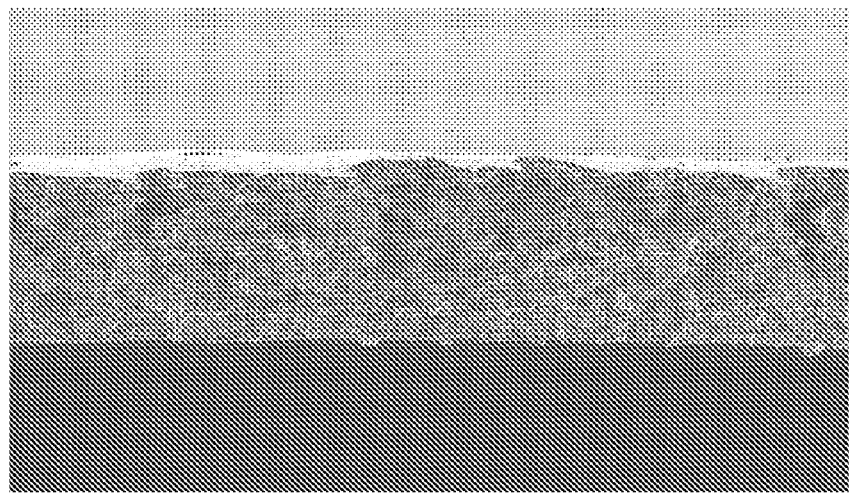
FIG. 5 is a SEM micrograph of a microporous membrane having a microstructure of Example 1.

A convenient method for assessing the symmetry and pore diameter of membranes is through the use of scanning electron microscopy (SEM). FIG. 5 of Example 1 is a SEM micrograph illustrating the generally symmetrical porous structure. The pores may have an average diameter of 0.05 to 25 microns. Preferably, the pore diameter is in a range of 0.5 to 10 microns. In one embodiment, the pores of a microstructure have a generally symmetrical morphology.

FIG. 6 of Example 2 is an SEM micrograph illustrating a membrane having first and second microstructures. The membrane has a porous structure comprising first and second faces extending in an x-dimension. A first face has a first microstructure having parallel elongated cylindrical pores extending in a z-dimension formed from a multilayer liquid induced phase separation. The second face has a second microstructure having ellipsoidal pores formed from a vapor induced phase separation. FIG. 7 of Example 2 illustrates a surface scan (planar view) of the first face of the membrane. The dope formulation may have different coagulation formulations on different faces of the dope formulation effecting phase inversions, which may result in the formation of similar or different microstructures on the faces.

In one embodiment, an article has a porous structure comprising first and second faces extending in an x-dimension. The first face has a first microstructure, and the second face has a second microstructure. The first and second faces are interconnected by the first and second micro structures.

FIG. 8 of Example 3 is a SEM micrograph illustrating a membrane having first and second microstructures. The dope formulation layer of Example 3 contained a porogen, and the first coagulant formulation layer comprised a coating adjuvant. The depth of a first microstructure in a z-dimension formed by a multilayer liquid induced phase separation is in a range of 5 to 95 percent of a membrane thickness. The depth of a second microstructure in a z-dimension formed by a vapor induced phase separation is in a range of 5 to 95 percent of the membrane thickness.

Thickness of the membranes may be dependent on the thickness of the dope and coagulant formulation layers when cast, and the subsequent removal of solvents followed by drying. Thicknesses of the membrane may be in the range of 20 to 200 microns, and more preferably in a range of 40 to 150 microns. Most preferably, the membrane thickness is in a range of 50 to 100 microns.

In one embodiment, a microporous membrane may be formed by simultaneously casting a dope formulation in between first and second coagulant formulations. The depth of a first microstructure formed by a multilayer induced phase separation is in a range of 5 to 95 percent of a membrane thickness. The depth of a second microstructure formed by a multilayer induced phase separation is in a range of 5 to 95 percent of a membrane thickness.

In one embodiment, a microporous membrane having first and second microstructures formed by multilayer induced phase separation and vapor induced phase separation, respectively, have different first and second microstructures.

In one embodiment, a microporous membrane having first and second microstructures formed by multilayer induced phase separation has different first and second microstructures.

In one embodiment, at least two dope formulations and at least two coagulant formulations being simultaneously cast and further optionally comprising a vapor coagulant to form a multizone microporous membrane.

It will be appreciated for one to be able to form a multizone microporous membrane having multiple dope and coagulant layers comprising multiple zones or microstructures.

Applications such as use in filtration, reinforced adhesives, and drug delivery properties can be envisioned. The utility of the process resides in the ability to form porous membranes useful for micro-filtration and ultra-filtration applications.

The invention will be further clarified by the following examples which are exemplary and not intended to limit the scope of the invention.

EXAMPLES

The present invention is more particularly described in the following examples that are intended as illustrations only, since numerous modifications and variations within the scope of the present invention will be apparent to those skilled in the art. Unless otherwise noted, all parts, percentages, and ratios reported in the following examples are on a weight basis, and all reagents used in the examples were obtained, or are available, from the chemical suppliers described below, or may be synthesized by conventional techniques.

Bubble Point Pressure (BPP)—ASTM Standard E-128-99 (2005). BPP measurements were recorded on 47 mm diameter pre-wetted microporous membranes.

Water Flow Rate (WFR)—WFR measurements were recorded on microporous membranes. The membranes were pre-wetted with isopropanol and deionized water. A measure of the length of time required for deionized water to pass through the microporous membrane under reduced pressure (59 cm (Hg)) was recorded. The WFR method is further described in U.S. Pat. Nos. 7,125,603 and 6,878,419 (Mekala et al.), herein incorporated by reference.

Surface treatment—Plasma treatment of membranes included etching the surface by exposing it to a mixture of $O_2$ and $C_3F_8$ (perfluoropropane) in the plasma state for 5 minutes. Known techniques for etching polymeric surfaces have been described in Khulbe, K. C. et al.; *J. Membrane Science;* 171, 2000, pp. 273-284 and Bauer, C. J. M. et al.; *J. Membrane Science,* 57, 1991, pp. 307-320, incorporated by reference herein.

Example 1

Dope and coagulant formulations were fed to a multilayer extrusion die of FIG. 1 (U.S. patent application Ser. No. 11/295,764 incorporated by reference herein) by syringe pumps (Model PHD 2000; Harvard Apparatus; Holliston, Mass.) which were used to meter the dope and coagulant formulations to the cavities of the multilayer extrusion die at volumetric flow rates ranging from 5 to 40 ml/minute.

A multilayer sheet was coextruded from a multilayer extrusion die and transferred to a backup roll around which corona-treated polyester film backing (20 to 50 microns in thickness) was conveyed. The backing was advanced at a line speed of 150 cm/minute.

The center slot of the multilayer extrusion die was fed a dope formulation of 15% by weight of polyetherimide (PEI) (melt flow index=9 g/10 min.; Sigma-Aldrich; St. Louis, Mo.) dissolved in 1-methyl-2-pyrrolidinone (NMP) (Sigma-Aldrich; St. Louis, Mo.) (viscosity=260 centipoise) at a rate of 16 ml/min; one of the adjacent slots of the multilayer extrusion die was fed a coagulant formulation having 90 weight percent polyethylene glycol as a coating adjuvant (PEG-400) (Molecular weight=400 g/mole; Sigma-Aldrich; St. Louis, Mo.) and 10 weight percent water as a coagulant. The viscosity of the coagulant formulation was 70 centipoise. The dope and coagulant formulations were cast as layers on to one another through the multilayer extrusion die forming an interface, and the two-layer coating was commenced with a gap of approximately 500 microns between the multilayer extrusion die and the backup roll.

The results of the multilayer induced phase inversion are illustrated in the cross-sectional SEM shown in FIG. 5. Specifically, the resulting microporous membrane can be characterized by a mixture of closed cells and pore size diameters of about 1 to 2 microns. The morphology of the membrane is generally symmetric extending from one face of the membrane to another.

Example 2

Dope formulation and first coagulant formulations were fed to a multilayer extrusion die of FIG. 1 (U.S. patent application Ser. No. 11/295,764 incorporated by reference herein) by syringe pumps (Model PHD 2000; Harvard Apparatus; Holliston, Mass.) which was used to meter the dope formulation and the first coagulant formulations to the cavities of the multilayer extrusion die at volumetric flow rates ranging from 5 to 40 ml/minute.

A multilayer sheet was extruded from the multilayer extrusion die and transferred to a backup roll around which corona-treated polyester film backing (20 to 50 microns in thickness) was conveyed. The backing was advanced at a line speed of 150 cm/minute.

The center slot of the coating die was fed a dope formulation of 13% by weight of polyetherimide (PEI) (melt flow index=9 g/10 min.; Sigma-Aldrich; St. Louis, Mo.) dissolved in 1-methyl-2-pyrrolidinone (NMP) (Sigma-Aldrich; St. Louis, Mo.) (viscosity=260 centipoise) at a rate of 16 ml/min; one of the adjacent slots of the multilayer extrusion die was fed a first coagulant formulation having 80 weight percent polyethylene glycol as a coating adjuvant (PEG-400) (Molecular weight=400 g/mole; Sigma-Aldrich; St. Louis, Mo.) and 20 weight percent water as a coagulant. The viscosity of the coagulant formulation was 54 centipoise. The dope and first coagulant formulations were cast as layers on to one another through the multilayer extrusion die forming an interface. A first surface of the dope formulation layer was opposite the interface formed from the dope formulation and coagulant formulation layers. The two-layer coating was commenced with a gap of approximately 500 microns between the multilayer extrusion die and the backup roll.

A second coagulant having a coagulant as a vapor was introduced at the first surface of a multilayer membrane having a first microstructure resulting in a vapor induced phase separation. Dope formulation and first coagulant formulation layers were cast as described above undergoing a liquid-polymer induced phase separation followed by subsequent exposure of the first surface of the membrane to water vapor created by the injection of steam within an 8 meter long drying oven. Through steam injection, a relative humidity of between about 50 and 60% was maintained. Oven parameters used are listed in Table 1.

TABLE 1

| Oven Configuration | | | |
| --- | --- | --- | --- |
| | Zone 1 | Zone 2 | Zone 3 |
| Air Temperature (° F.) | 120 | 120 | 120 |
| Nozzle Type (*T/B) | —/Airfoils | —/Airfoils | TEC/TEC |
| Air Pressure (*T/B) | 0.5" water | 0.5" water | 1/1" water |

*T/B: Top/Bottom (airflow configuration of air flotation nozzles or air bars - TEC (Grace TEC Systems; DePere, Wisconsin), and Airfoils (Grace TEC Systems; DePere, Wisconsin)).

The results from the multizone microporous membrane are illustrated in the cross-sectional SEM shown in FIG. 6 and planar view of FIG. 7. Specifically, the resulting microporous membrane is characterized by a mixture of closed cells and pore sizes of about 1 to 2 microns in diameter. The first zone of the liquid induced phase inversion has a morphology representative of porous elongated voids having a thickness of about 32 microns (about 50 percent of the thickness of the membrane in a z-dimension). The second zone of the vapor induced phase inversion has a spongy microstructure having a thickness of about 35 microns (about 50 percent of the thickness of the membrane in a z-dimension). The pores of the first and second zones appear to be interconnected across the zones with different pore structures.

The membrane had filtration properties (BPP) of about 20.8 psi. WFR testing resulted in no flow without surface treatment, and the WFR was minutes with both sides etched.

Example 3

A dope formulation and a first coagulant formulation were fed to a multilayer extrusion die using a similar equipment arrangement to Example 2.

The center slot of the coating die was fed a dope formulation of 13% by weight of polyethersulfone (PES) (Molecular weight <60,000 g/mole; Solvay; Alpharetta, Ga.) dissolved in a mixture of 1-methyl-2-pyrrolidinone (30 weight percent) (NMP) (Sigma-Aldrich; St. Louis, Mo.)/polyethylene glycol (70 weight percent) (PEG-400) (molecular weight=400 g/mole; Sigma-Aldrich; St. Louis, Mo.) as a porogen (pore former). The viscosity of the dope formulation was 3,400 centipoise. The flow rate of the dope formulation was 20 ml/minute. One of the adjacent slots of the multilayer extrusion die was fed a coagulant formulation at a flow rate of 10 ml/minute. The two-layer coating was commenced with a gap of approximately 500 microns between the multilayer extrusion die and the backup roll.

A second coagulant was used in a similar manner as Example 2.

The results from the formation of a multizone microporous membrane are illustrated in FIG. 8. Specifically, the resulting microporous membrane had an open cellular morphology having a pore size distribution of about 0.6-1 microns. The first zone of the liquid induced phase inversion had porous elongated voids and a thickness of about 75 microns, and a second porous zone resulting from the vapor induced phase separation having a spongy microstructure had a thickness of about 25 microns.

The WFR was 2 minutes with no surface treatment, and the WFR was 18 seconds after etching both sides of the membrane.

Various modifications and alterations of this invention will be apparent to those skilled in the art without departing from the scope and spirit of this invention, and it should be understood that this invention is not limited to the illustrative elements set forth herein.

What is claimed is:

1. A method for forming a microporous membrane sheet having a microstructure, the method comprising:
    a) providing a dope formulation comprising a polymeric material and a solvent;
    b) providing a first coagulant formulation comprising a first coagulant and a first coating adjuvant;
    c) simultaneously casting the dope formulation to provide a dope formulation layer having a first surface and the first coagulant formulation to provide a first coagulant formulation layer under conditions that form an interface between the first coagulant formulation layer and the dope formulation layer, the interface being opposite the first surface of the dope formulation layer, the first coagulant formulation diffusing into the dope formulation through the interface effecting a first phase inversion;
    d) contacting the first surface of the dope formulation layer with a second coagulant which is a vapor simultaneously with the dope formulation and the first coagulant formulation; the second coagulant diffusing into the dope formulation layer through the first surface effecting a second phase inversion, thereby forming the membrane sheet having a first microstructure and a second microstructure, wherein the first microstructure is different than the second microstructure and the method is accomplished in the absence of a separate step of exposing the dope formulation layer to a coagulation bath, and
    e) removing the solvent.

2. The method of claim 1, further comprising removing the solvent, and drying the membrane.

3. The method of claim 1, wherein the method occurs in the absence of a coagulation bath.

4. The method of claim 1, wherein the polymeric material is selected from the group consisting of polyethersulfones, polyether imides, nylons and combinations thereof.

5. The method of claim 1, wherein the solvent is selected from the group consisting of water, amides, alcohols, aliphatic glycols and combinations thereof.

6. The method of claim 1, wherein the concentration of the polymeric material of the dope formulation is in a range of 10 to 25 weight percent.

7. The method of claim 1, wherein the first coating adjuvant is selected from the group consisting of poly (ethylene glycol) s, polyethers and combinations thereof.

8. The method of claim 1, wherein a concentration of the first coating adjuvant is in a range of 20 to 95 weight percent.

9. The method of claim 1, wherein the simultaneously casting is accomplished by means of a multilayer extrusion die.

10. The method of claim 1, wherein the dope formulation has a viscosity in a range of 20 to 4,000 centipoise.

11. The method of claim 1, wherein the first coagulant formulation has a viscosity in a range of 20 to 4,000 centipoise.

* * * * *